(12) United States Patent
Thomas

(10) Patent No.: US 10,196,897 B2
(45) Date of Patent: Feb. 5, 2019

(54) FAN EXIT GUIDE VANE PLATFORM CONTOURING

(71) Applicant: United Technologies Corporation, Hartford, CT (US)

(72) Inventor: Flavien L. Thomas, Moodus, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 547 days.

(21) Appl. No.: 14/774,190

(22) PCT Filed: Mar. 13, 2014

(86) PCT No.: PCT/US2014/025386
§ 371 (c)(1),
(2) Date: Sep. 10, 2015

(87) PCT Pub. No.: WO2014/197062
PCT Pub. Date: Dec. 11, 2014

(65) Prior Publication Data
US 2016/0017715 A1 Jan. 21, 2016

Related U.S. Application Data

(60) Provisional application No. 61/823,150, filed on May 14, 2013, provisional application No. 61/786,746, filed on Mar. 15, 2013.

(51) Int. Cl.
*F01D 5/14* (2006.01)
*F02K 3/06* (2006.01)
*F01D 9/02* (2006.01)

(52) U.S. Cl.
CPC ............ *F01D 5/143* (2013.01); *F01D 9/023* (2013.01); *F02K 3/06* (2013.01); *F05D 2220/36* (2013.01);
(Continued)

(58) Field of Classification Search
CPC ... F01D 5/14; F01D 9/023; F02K 3/06; F05D 2220/36; F05D 2250/711; F05D 2250/712
See application file for complete search history.

(56) References Cited

U.S. PATENT DOCUMENTS 5,215,439 A 6/1993 Jansen et al.
5,369,954 A * 12/1994 Stuart ................... B64D 29/00
239/265.17
(Continued)

FOREIGN PATENT DOCUMENTS

JP 02191854 A * 7/1990

OTHER PUBLICATIONS

Extended European Search Report for European Application No. 14807829.8, dated Nov. 22, 2016.
(Continued)

*Primary Examiner* — Patrick Maines
(74) *Attorney, Agent, or Firm* — Carlson, Gaskey & Olds, P.C.

(57) ABSTRACT

A turbofan engine includes a fan section with a plurality of fan blades rotatable about an engine axis generating an airflow, a bypass passage through which the airflow passes, and a fan exit guide vane. The fan exit guide vane assembly includes a plurality of airfoils disposed between an inner platform wall and an outer platform wall. At least one of the inner platform wall and the outer platform wall includes a contoured surface between adjacent airfoils. The contoured surface includes at least one concave region and at least one convex region. A method of reducing secondary flow structures in bypass air flow with the turbofan is also disclosed.

10 Claims, 3 Drawing Sheets

(52) U.S. Cl.
CPC .. *F05D 2250/711* (2013.01); *F05D 2250/712* (2013.01); *Y02T 50/673* (2013.01)

(56) References Cited

U.S. PATENT DOCUMENTS

| | | | |
|---|---|---|---|
| 5,397,215 | A | 3/1995 | Spear et al. |
| 5,466,123 | A | 11/1995 | Rose |
| 6,017,186 | A | 1/2000 | Hoeger et al. |
| 6,283,713 | B1 | 9/2001 | Harvey et al. |
| 6,471,474 | B1 | 10/2002 | Mielke et al. |
| 6,478,545 | B2 | 11/2002 | Crall et al. |
| 6,511,294 | B1 | 1/2003 | Mielke et al. |
| 6,524,070 | B1 | 2/2003 | Carter |
| 6,561,761 | B1 | 5/2003 | Decker et al. |
| 6,669,445 | B2 | 12/2003 | Staubach et al. |
| 6,837,679 | B2 | 1/2005 | Kawarada et al. |
| 6,969,232 | B2 | 11/2005 | Zess et al. |
| 7,134,842 | B2 | 11/2006 | Tam et al. |
| 7,217,096 | B2 | 5/2007 | Lee |
| 7,354,243 | B2 | 4/2008 | Harvey |
| 7,690,890 | B2 | 4/2010 | Aotsuka et al. |
| 7,887,297 | B2 | 2/2011 | Allen-Bradley et al. |
| 8,105,037 | B2 | 1/2012 | Grover et al. |
| 8,177,499 | B2 | 5/2012 | Iida |
| 8,192,153 | B2 | 6/2012 | Harvey et al. |
| 8,192,154 | B2 | 6/2012 | Sonoda et al. |
| 8,206,115 | B2 | 6/2012 | Gupta et al. |
| 8,231,353 | B2 | 7/2012 | Siden et al. |
| 8,444,378 | B2 | 5/2013 | Clemen |
| 2007/0258810 | A1 | 11/2007 | Aotsuka et al. |
| 2007/0258819 | A1 | 11/2007 | Allen-Bradley et al. |
| 2008/0072569 | A1* | 3/2008 | Moniz ............. F01D 5/147 60/226.1 |
| 2010/0232954 | A1* | 9/2010 | Clemen ............. F02K 3/06 415/199.4 |
| 2012/0051894 | A1 | 3/2012 | Clements et al. |
| 2012/0051930 | A1 | 3/2012 | Pandey et al. |
| 2012/0093642 | A1* | 4/2012 | Nilsson ............. F01D 9/04 415/213.1 |
| 2012/0201688 | A1 | 8/2012 | Mahle et al. |
| 2012/0233981 | A1 | 9/2012 | Smith et al. |
| 2015/0128562 | A1* | 5/2015 | Kusuda ............. F04D 29/545 60/226.1 |

OTHER PUBLICATIONS

International Search Report and Written Opinion for International Application No. PCT/US2014/025386 dated Dec. 22, 2014.
International Preliminary Report on Patentability for International Application No. PCT/US2014/025386 dated Sep. 24, 2015.

* cited by examiner

FAN EXIT GUIDE VANE PLATFORM CONTOURING

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

The fan section drives air through a bypass passage. Fan exit guide vanes are provided in the bypass passage aft of the fan section to straighten air flow leaving the fan. Fan exit guide vanes include airfoils extending between inner and outer platforms. Flow through the exit guide vanes may include secondary flow structures that can generate duct losses. The secondary flow structures can include vortices extending from a trailing edge of the guide vanes.

Although geared architectures have improved propulsive efficiency, turbine engine manufacturers continue to seek further improvements to engine performance including improvements to thermal, transfer and propulsive efficiencies.

SUMMARY

In a featured embodiment, an exemplary turbofan engine includes a fan section having a plurality of fan blades rotatable about an engine axis generating an airflow, a bypass passage through which the airflow passes, and a fan exit guide vane assembly including a plurality of airfoils disposed between an inner platform wall and an outer platform wall. At least one of the inner platform wall and the outer platform wall includes a contoured surface between adjacent airfoils. The contoured surface includes at least one concave region and at least one convex region.

In another embodiment according to the previous embodiment, at least one of the at least one convex region and the at least one concave regions comprise a subregion with a concavity or convexity different from that of the convex or concave region.

In another embodiment according to any of the previous embodiments, one of the inner and outer platform walls has an axisymmetric cross-section at a leading edge and a trailing edge of a plane defined by the adjacent ones of the plurality of airfoils, and the leading and trailing edges of the adjacent ones of the plurality of airfoils bound an axial extent of the contoured surface.

In another embodiment according to any of the previous embodiments, the at least one convex region includes first and second convex regions adjacent to first and second airfoils of the plurality of airfoils, respectively.

In another embodiment according to any of the previous embodiments, the first and second convex regions extend axially from near a first midchord of the first airfoil and a second midchord of the second airfoil to near trailing edges of the first and second airfoils, respectively.

In another embodiment according to any of the previous embodiments, the at least one concave region includes a first concave region having first and second prongs.

In another embodiment according to any of the previous embodiments, the at least one convex region includes a third convex region between the first and second prongs of the first concave region.

In another embodiment according to any of the previous embodiments, the first and second prongs are oriented towards trailing edges of the adjacent ones of the plurality of airfoils.

In another embodiment according to any of the previous embodiments, the gas turbine engine further comprises a second concave region adjacent to a pressure side of one of the first and second airfoils.

In another embodiment according to any of the previous embodiments, the gas turbine engine further comprises a fourth convex region between the first and second concave regions.

In another embodiment according to any of the previous embodiments, the contoured surface transitions gradually from the at least one convex region to the at least one concave region.

In another featured embodiment, a method of reducing secondary flow structures in bypass air flow includes the steps of providing bypass airflow from a fan to the fan exit guide vane assembly, providing a fan exit guide vane assembly including a plurality of airfoils disposed between an inner platform wall and an outer platform wall, and providing a contoured surface on the inner platform wall, the contoured surface including at least one convex region and at least one concave region.

In another embodiment according to any of the previous embodiments, the inner platform wall includes the contoured surface.

In another embodiment according to any of the previous embodiments, the contoured surface transitions gradually from the at least one convex region to the at least one concave region.

In another embodiment according to any of the previous embodiments, at least one of the at least one convex region and the at least one concave regions comprise a subregion with a concavity or convexity different from that of the convex or concave region.

In another embodiment according to any of the previous embodiments, the contoured surface extends aft of leading edges and forward of trailing edges of the adjacent ones of the plurality of airfoils.

In another embodiment according to any of the previous embodiments, the at least one concave region includes a concave region having first and second prongs, and the at least one convex region includes a convex region arranged between the first and second prongs.

BRIEF DESCRIPTION OF THE DRAWINGS

The disclosure can be further understood by reference to the following detailed description when considered in connection with the accompanying drawings wherein.

DETAILED DESCRIPTION

Figure 1:
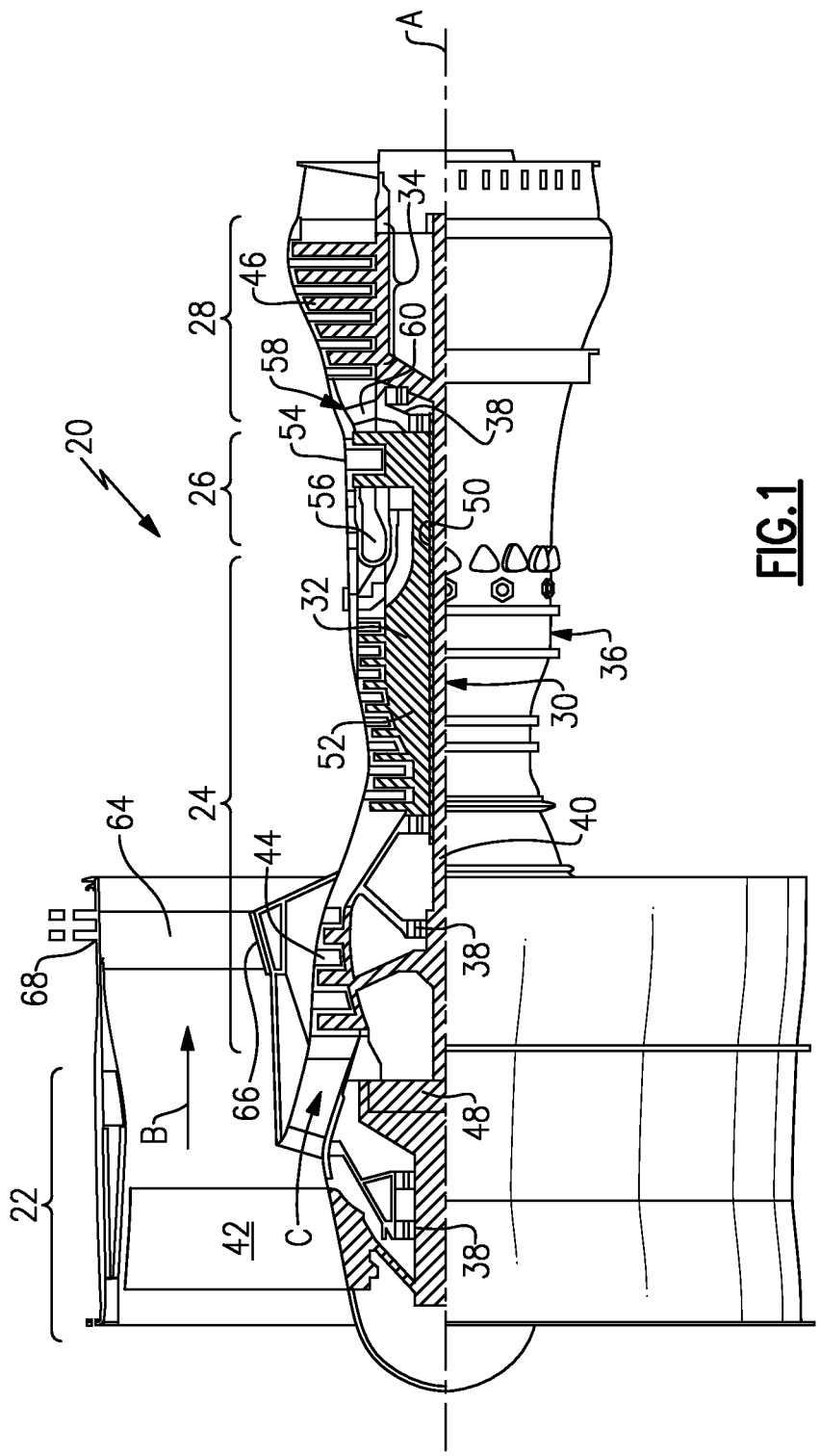
FIG. 1 schematically illustrates a gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

Airflow through the core airflow path C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/(518.7°\ R)]^{0.5}$. The "Low corrected fan tip speed", as disclosed herein according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

A fan exit guide vane assembly 63 is disposed within the bypass flow path B downstream of the fan section 22 and fan blades 42. The fan exit guide vane assembly 63 includes an airfoil (vane) 64 supported between an outer diameter platform 68 and an inner diameter platform 66. The airfoil 64 removes swirl and other directional components of airflow from the fan 42 to improve airflow properties and characteristics. As the fan exit guide vane assembly 63 turns flow from the fan 42, secondary flow structures such as vortices can be formed. Such vortices can result in losses in the duct.

Figure 2:
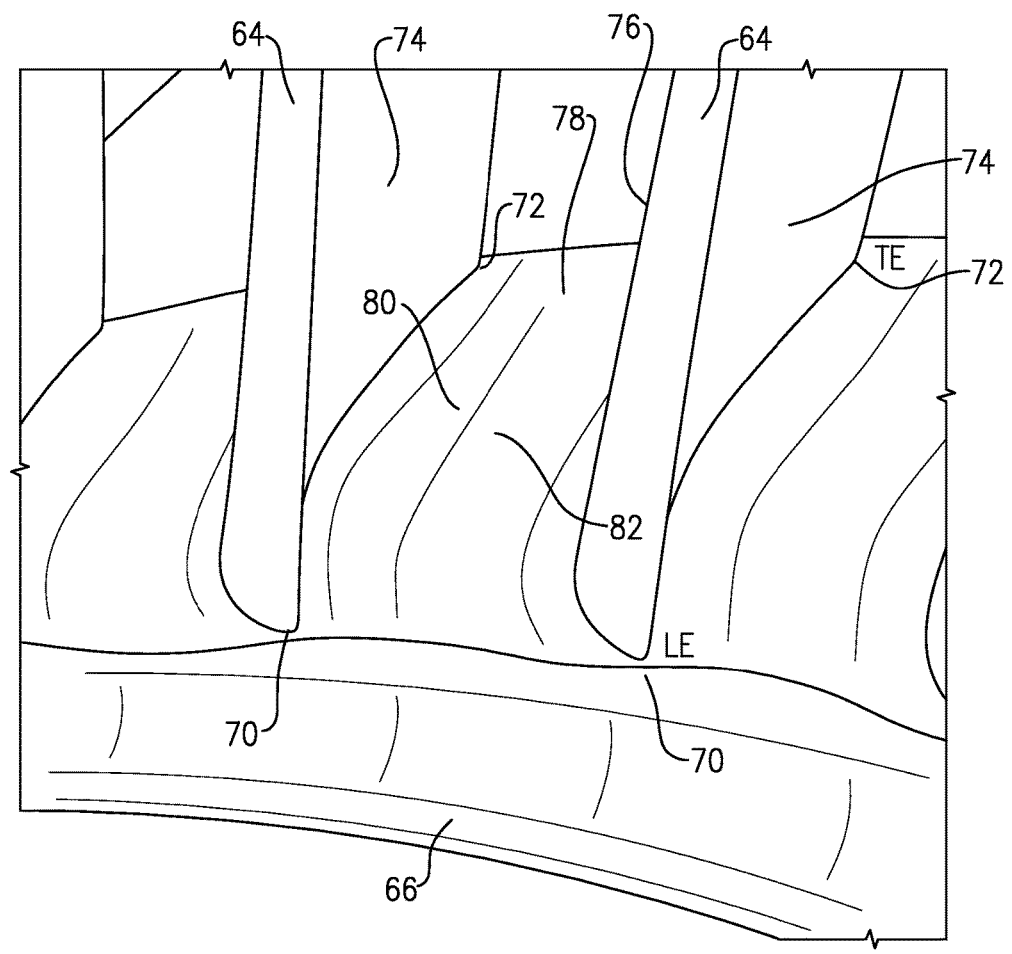
FIG. 2 schematically illustrates a platform with a contoured surface for fan exit guide vanes.
Figure 3:
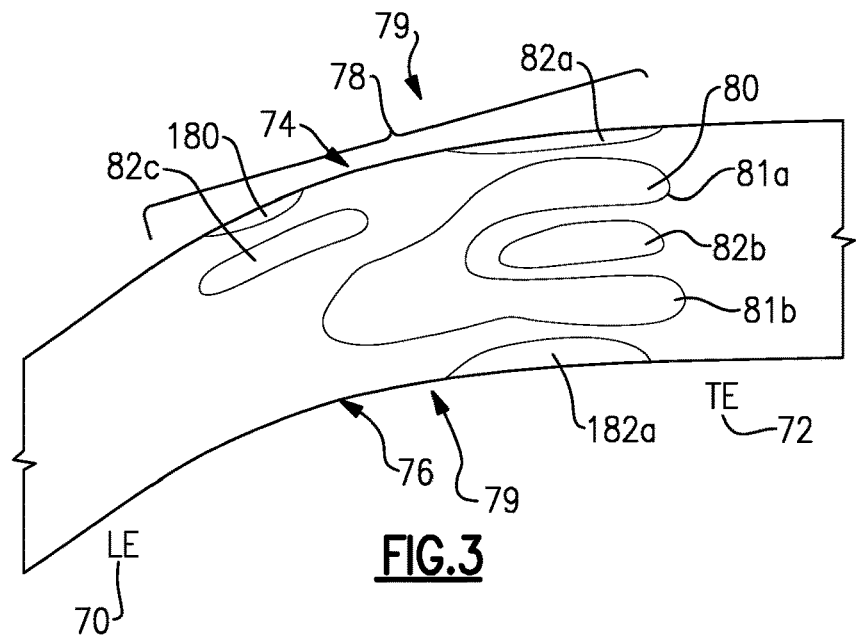
FIG. 3 schematically illustrates a detail top-down view of the contoured surface of FIG. 2.
Figure 4:
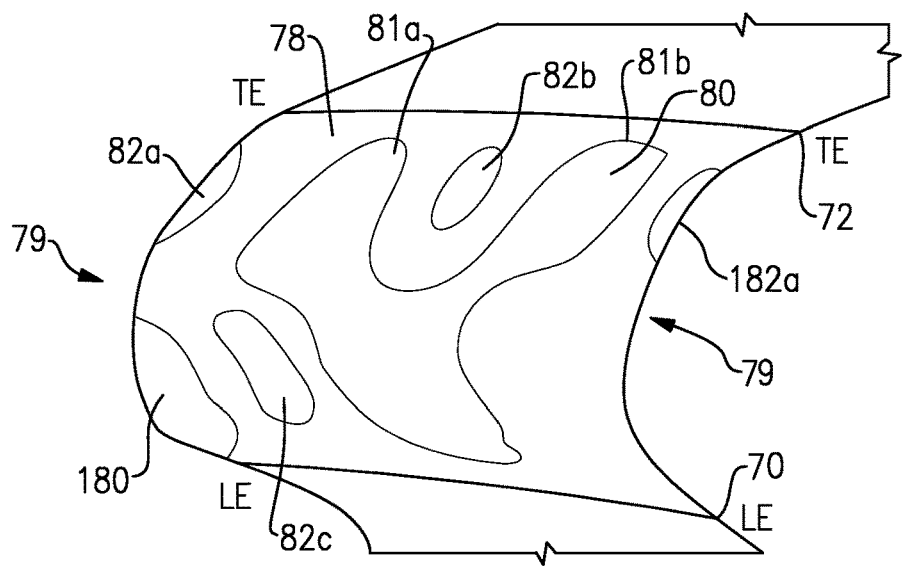
FIG. 4 schematically illustrates a detail isometric view of the contoured surface of FIG. 2.

Referring to FIGS. 2-4, a contoured surface 78 is provided between adjacent guide vane assemblies 63 to reduce the strength of secondary flow structures. This may increases flow efficiency and overall engine performance. The contoured surface 78 extends between a suction side 76 and a pressure side 74 of adjacent vanes 64. The platforms 66, 68 may include an axisymmetric cross section at a leading edge (LE) 70 and a trailing edge 72 (TE) of the vanes 64. In this disclosed example, the contoured surface 78 is disposed on the inner diameter platform 66. It is also within the contemplation of this disclosure that a contoured surface may also be provided on between vanes 64 on an inner side of the outer diameter platform 68.

The contoured surface 78 begins at the suction side 76 of one vane 64 and transitions radially outward in a convex region 82. From the convex region 82, the surface transitions gradually radially inward toward a concave region 80. From the inner most part of the concave region 80, the surface 78 transitions radially outward to another convex region 82. As appreciated, the concave regions 80 are depressions within the surface 78 and the convex regions 82 are raised surfaces. The surface 78 transitions smoothly from one convex region 82 to the next convex region. Concave and convex regions 80, 82 may be composed of multiple subregions of varying concavity or convexity.

The example contoured surface 78 provides hills or raised portions referred to as the convex regions 82 at the locations close to vanes 64. In another example, the contoured surface may include concave regions 80 close to the surfaces of the vanes 64. The concave regions 80 are disposed between the convex regions 82. The contoured surface 78 therefore defines a varying surface between vanes 64 that includes a series of ridges and troughs between vanes 64.

FIGS. 3 and 4 show top-down and isometric views of an example contoured surface 78, respectively. The example contoured surface 78 is disposed on the inner diameter platform 66 and includes concave portions 80 and convex portions 82 that gradually transition from the suction side 76 of one vane 64 to the pressure side 74 of the adjacent vane 64. The example contoured surface 78 is spaced apart from both the leading edge (LE) 70 and the trailing edge (TE) 72. In one example, the contoured surface 78 does not extend axially past the leading and trailing edges 70, 72. That is, the contoured surface 78 may start aft of the leading edge 70 and end forward of the trailing edge 72, such that the airfoils 64 leading and trailing edges 70, 72 bound the axial extent of the contoured surface 78.

In the example shown, convex portions 82a, 182a are adjacent to the vanes 64 (FIG. 2) trailing edges 72 and extend toward a midchord region 79 of the vane 64. A concave portion 80 between the vanes 64 may have two prongs 81a, 81b oriented towards the trailing edge 72 of the vanes 64. A convex portion 82b may be between the two prongs 81a, 81b towards the trailing edge 72. An additional convex portion 82c may be located towards the leading edge of the adjacent vanes 64. An additional concave portion 180 may be located between the additional convex portion 82c and the pressure side 74 of the vane 64 (FIG. 2), adjacent to the leading edge 70 and extending towards the midchord 79 of the vane 64.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A turbofan engine comprising:
   a fan section including a plurality of fan blades rotatable about an engine axis generating an airflow;
   a bypass passage through which the airflow passes; and
   a fan exit guide vane assembly including a plurality of airfoils disposed between an inner platform wall and an outer platform wall, wherein at least one of the inner platform wall and the outer platform wall includes a contoured surface between adjacent ones of the plurality of airfoils, and wherein the contoured surface includes at least one concave region and at least one convex region, wherein at least one of the at least one convex region and the at least one concave regions comprise a subregion with a concavity or convexity different from that of the convex or concave region.

2. The turbofan engine as recited in claim 1, wherein one of the inner and outer platform walls has an axisymmetric cross-section at a leading edge and a trailing edge of a plane defined by the adjacent ones of the plurality of airfoils, and the leading and trailing edges of the adjacent ones of the plurality of airfoils bound an axial extent of the contoured surface.

3. The turbofan engine as recited in claim 1, wherein the at least one convex region includes first and second convex regions adjacent to first and second airfoils of the plurality of airfoils, respectively.

4. The turbofan engine as recited in claim 3, wherein the first and second convex regions extend axially from near a first midchord of the first airfoil and a second midchord of the second airfoil to near trailing edges of the first and second airfoils, respectively.

5. The turbofan engine as recited in claim 1, wherein the contoured surface transitions gradually from the at least one convex region to the at least one concave region.

6. A turbofan engine comprising:
   a fan section including a plurality of fan blades rotatable about an engine axis generating an airflow;
   a bypass passage through which the airflow passes; and
   a fan exit guide vane assembly including a plurality of airfoils disposed between an inner platform wall and an outer platform wall, wherein at least one of the inner platform wall and the outer platform wall includes a contoured surface between adjacent ones of the plurality of airfoils, and wherein the contoured surface includes at least one concave region and at least one convex region, wherein the at least one convex region includes first and second convex regions adjacent to first and second airfoils of the plurality of airfoils, respectively, wherein the first and second convex regions extend axially from near a first midchord of the first airfoil and a second midchord of the second airfoil to near trailing edges of the first and second airfoils, respectively, wherein the at least one concave region includes a first concave region having first and second prongs.

7. The turbofan engine as recited in claim 6, wherein the at least one convex region includes a third convex region between the first and second prongs of the first concave region.

8. The turbofan engine as recited in claim 6, wherein the first and second prongs are oriented towards trailing edges of the adjacent ones of the plurality of airfoils.

9. The turbofan engine as recited in claim 8 further comprising a second concave region adjacent to a pressure side of one of the first and second airfoils.

10. The turbofan engine as recited in claim 9, further comprising a fourth convex region between the first and second concave regions.

\* \* \* \* \*